Nov. 20, 1956     H. B. SHADID     2,771,366
METHOD OF PREPARING A MEAT PRODUCT
Filed Oct. 11, 1954     2 Sheets-Sheet 1
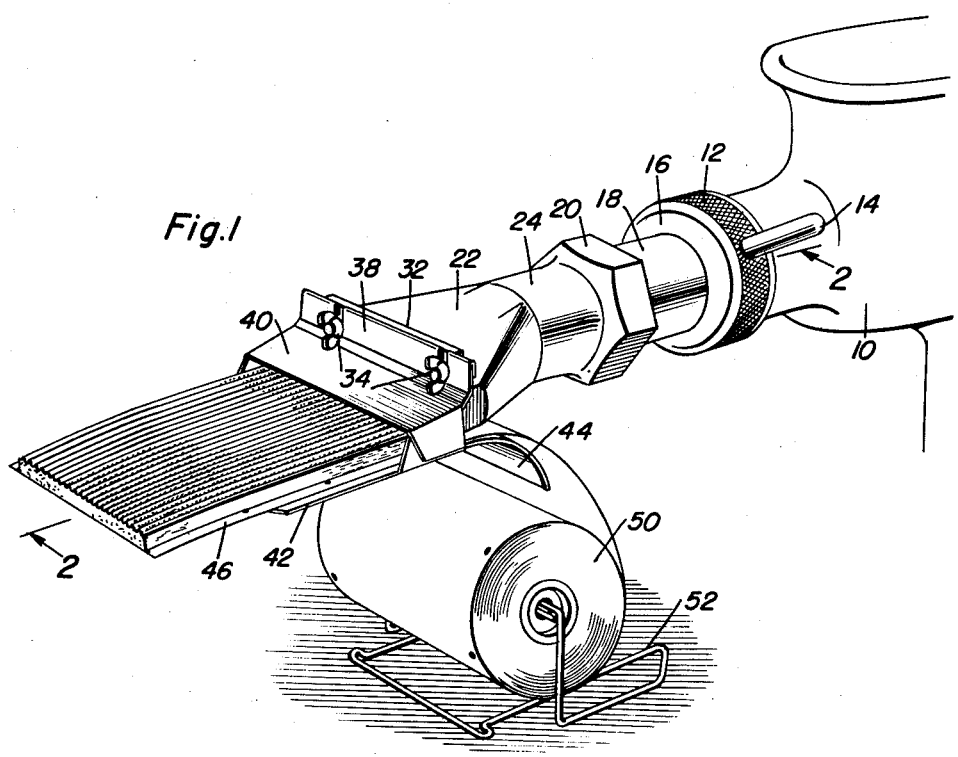
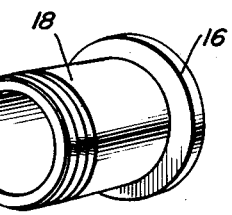
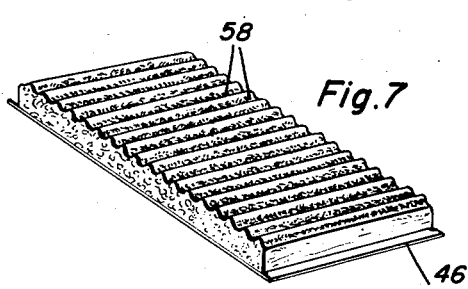
Hollum B. Shadid
INVENTOR.
BY *Clarence A. O'Brien*
*and Harvey B. Jacobson*
Attorneys Nov. 20, 1956 — H. B. SHADID — 2,771,366
METHOD OF PREPARING A MEAT PRODUCT
Filed Oct. 11, 1954 — 2 Sheets-Sheet 2
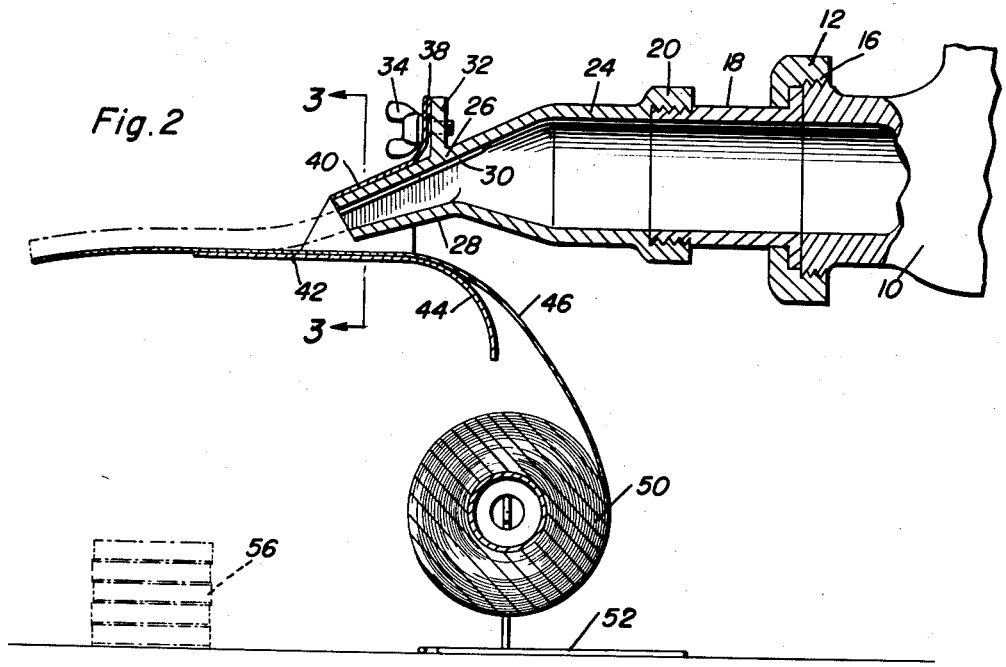
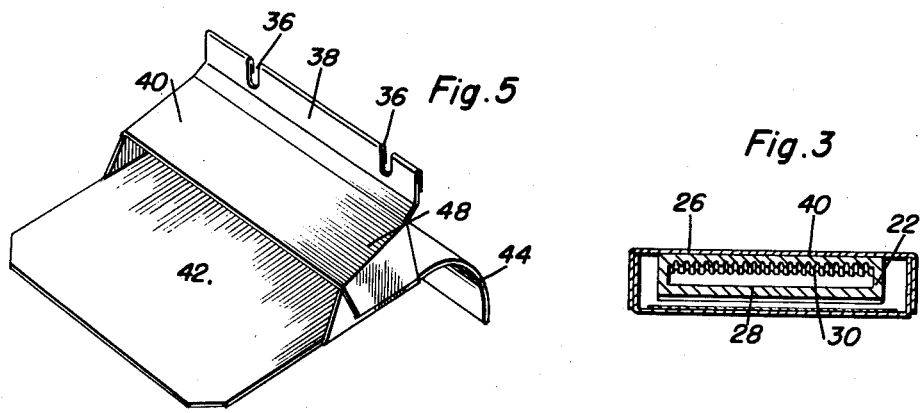
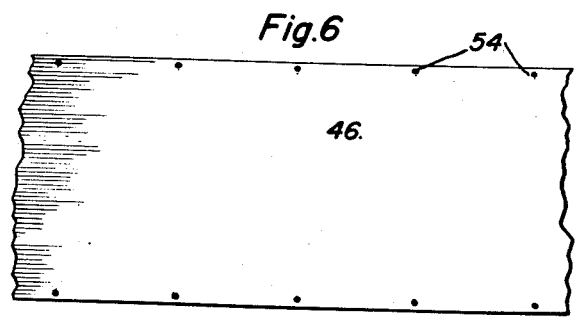
Hollum B. Shadid
INVENTOR.

2,771,366
METHOD OF PREPARING A MEAT PRODUCT

Hollum B. Shadid, Oklahoma City, Okla.

Application October 11, 1954, Serial No. 461,398

1 Claim. (Cl. 99—108)

This invention relates to a process of preparing a meat product.

The primary object of the present invention resides in the provision of a process for preparing an unexpectedly appetizing and tasty meat product from scraps of lean beef and connecting tissues which normally adhere to beef bones.

The concept of this invention features the grinding of lean beef and connecting tissue and then allowing this ground meat to stand while chilled until the connecting tissue turns gelatinous so as to be capable of bonding meat particles. Then, the meat product is again ground and compressed while the fibers are being interwoven to result in a meat product that when cooked, remains substantially the same size and shape, with the particles of meat adhering to each other so as to have the consistency of a choice cut of beef such as steak or the like.

The invention features a process which includes the compression of the ground meat product, the serrating thereof and the delivery of the meat product in a strip onto a sheet of paper.

The accompanying drawings illustrate one form of apparatus which may be employed in practicing the invention, wherein:

Figure 1 is a perspective view of an apparatus for carrying out the present invention shown preparing the meat product;

Figure 2 is a vertical sectional detail view as taken along the plane of line 2—2 in Figure 1;

Figure 3 is a transverse sectional view as taken along the plane of line 3—3 in Figure 2;

Figure 4 is an exploded perspective view of the shaper and associated adapter;

Figure 5 is a perspective view of the paper guide;

Figure 6 is a plan view of a section of a roll of paper which may be utilized in combination with the other elements of the apparatus; and Figure 7 is a perspective view of a portion of the meat product resulting from the process comprising the present invention.

The accompanying drawings in conjunction with the following description set forth a preferred apparatus capable of practicing the steps of the process of the invention, it being understood that other apparatuses may be employed. A conventional meat grinder 10 is provided with a connecting ring 12 which may have a handle or other suitable means, such as indicated at 14, for enabling the locking ring 12 to be readily rotated so as to engage and hold the flange 16 of an adapter collar 18 to the meat grinder 10.

The adapter collar 18 is threadedly received in the internally threaded end section 20 of a shaper 22, the end portion 20 being preferably shaped similar to an enlarged nut so that such may be readily rotated with respect to the adapter 18.

The shaper 22 has a substantially cylindrical section 24 which is adapted to receive ground meat product passing through the adapter 18 from the grinder 10. Further, the shaper 22 flares outwardly to a comparatively wide mouth end and is provided with a downwardly sloping upper plate 26 as well as a downwardly sloping lower plate 28 which does not slope at as great an angle as the upper plate 26 so as to be converging to form a restricted opening at the mouth end of the shaper. It is to be noted that while the mouth end is substantially wider, the total size of the opening at the mouth end of the shaper 22 is less than the cross-sectional area of the cylindrical portion 24.

The upper plate 26 is provided with a plurality of downwardly spaced pressure ribs 30. Further, the upper plate 26 has an upwardly extending rib 32 preferably integrally formed therewith which is adapted to provide means into which wing screws 34 may be threaded, the wing screws being engageable within recesses, at 36, in the flange 38 of a paper guide 40. The paper guide 40 includes a lower plate 42 which has an arcuate portion, as at 44, over which paper, as at 46, is adapted to be fed. The lower plate 42 extends substantially horizontally so as to form an acute angle with respect to the lower plate 28 thereby assuring proper feeding of the paper as the meat product is delivered from the shaper 22. It is noted that the overhang of plate 26 forces the meat product onto the paper 46. The paper guide further includes a substantially U-shaped portion 48 being secured to the plate 42 and together with the plate 42 embracing the discharge or mouth end of the shaper 22. The plate 42 is somewhat wider than the mouth end of the shaper 22 so that when the meat product is deposited upon the paper 46, it will not occupy the full width of the paper 46.

The paper 46 may be arranged on a roll 50 carried by a suitable paper roll supporting member 52 which is adapted to rest on a suitable supporting surface or to be suspended on a suitable vertical surface, the construction of which is best seen in Figure 1. This support 52 for the paper roll 50 is conventional.

The paper 46 may be provided with suitable indicia, such as dots or other markings 54 adjacent the edge of the paper for indicating to the user of the machine a particular width, and in view of the compactness of the meat product delivered from the shaper 22, a comparatively accurate means for determining the weight of the meat product delivered. A shears or automatic knives, as well as any other means for cutting the paper and associated meat product may be utilized and the meat product can then be stacked, as is indicated at 56 in Figure 2.

In order to form lean pieces of beef and connecting tissues, such as the tissue between various bones, and the tissue which generally interconnects the meat to the bone, into a very tender and sumptuous meat product, it is necessary to grind the lean beef and connecting tissue. Then, chilling the ground meat product for a period of approximately eight hours or preferably over night, the connecting tissue turns gelatinous. Then, the meat product is again ground and forced through the shaper where it is compressed while being provided with longitudinal serrations so as to interweave the fibers of the meat product thus forming a cohesive ground meat product. The meat product which is compressed to form the ridges 58 therein, as can be seen best in Figures 1 and 7, because of the ribs 30, will be fed onto the paper in strip form and the gravity feed of the meat product will cause the paper 46 to feed itself. Then, the paper and meat product may be cut, as desired.

The ridges 58 provide means for enabling better heat penetration of the meat product during the cooking thereof, and it has been found that during the cooking thereof, there is no sizable reduction in size while after cooking, the meat product is unexpectedly cohesive.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

The method of preparing a cohesive strip of ground meat product from lean beef and connective tissues, said method including the steps of grinding lean beef and connective tissues, chilling the ground meat product until the ground connective tissues turn gelatinous, regrinding the chilled meat product, compressing the meat product while providing said ground meat product with longitudinal serrations so as to interweave the fibers of the ground meat thereby forming a cohesive ground meat product.

References Cited in the file of this patent

UNITED STATES PATENTS

| | | |
|---|---|---|
| 2,123,336 | Kabus | July 12, 1938 |
| 2,203,318 | Yerk | June 4, 1940 |
| 2,209,824 | Louisot et al. | July 30, 1940 |
| 2,224,397 | Komarik | Dec. 10, 1940 |
| 2,654,121 | Nelson | Oct. 6, 1953 |